United States Patent
Tajima et al.

(10) Patent No.: US 9,213,293 B2
(45) Date of Patent: Dec. 15, 2015

(54) IMAGE FORMING APPARATUS HAVING MEASUREMENT UNIT THAT IRRADIATES A MEASUREMENT IMAGE AND MEASURES LIGHT REFLECTED THEREFROM, AND HAVING SHIELDING UNIT THAT CAN BE MOVED TO BLOCK SUCH IRRADIATION AND MOVED TO NOT BLOCK SUCH IRRADIATION

(71) Applicant: CANON KABUSHIKI KAISHA, Tokyo (JP)

(72) Inventors: Hirotoshi Tajima, Toride (JP); Kenichi Hirota, Joso (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/141,075

(22) Filed: Dec. 26, 2013

(65) Prior Publication Data

US 2014/0185047 A1 Jul. 3, 2014

(30) Foreign Application Priority Data

Dec. 28, 2012 (JP) ................................. 2012-288229

(51) Int. Cl.
*G03G 15/00* (2006.01)
*G01J 3/46* (2006.01)

(52) U.S. Cl.
CPC .............. *G03G 15/5062* (2013.01); *G01J 3/46* (2013.01)

(58) Field of Classification Search
CPC ................................................ G03G 15/5062
USPC ............................................................ 399/15
See application file for complete search history.

(56) References Cited

U.S. PATENT DOCUMENTS

| | | | |
|---|---|---|---|
| 5,101,284 A * | 3/1992 | Tanabe | |
| 5,130,807 A * | 7/1992 | Tanabe et al. | |
| 6,989,915 B2 * | 1/2006 | Honjo et al. | |
| 7,499,158 B2 * | 3/2009 | Flemming et al. | |
| 8,320,023 B2 * | 11/2012 | Takahashi et al. | |
| 2008/0145089 A1 | 6/2008 | Takahashi | |
| 2010/0329710 A1 | 12/2010 | Yamazaki | |
| 2012/0092731 A1 * | 4/2012 | Nishida et al. | |
| 2012/0219306 A1 * | 8/2012 | Shiomichi et al. | |

FOREIGN PATENT DOCUMENTS

| | | | |
|---|---|---|---|
| JP | 06006589 A * | 1/1994 | |
| JP | H08-262817 A | 10/1996 | |
| JP | 2004-086013 A | 3/2004 | |

* cited by examiner

*Primary Examiner* — Walter L Lindsay, Jr.
*Assistant Examiner* — Milton Gonzalez
(74) *Attorney, Agent, or Firm* — Canon USA, Inc., IP Division

(57) ABSTRACT

An image forming apparatus includes an image forming unit configured to form a measurement image on a sheet, a measurement unit configured to irradiate the measurement image with light and measure light reflected from the measurement image, a white reference plate arranged to be movable to a first position opposed to the measurement unit and a second position separated farther from the measurement unit than the first position, a shielding unit arranged to be movable to a third position that blocks the light with which the measurement unit irradiates the white reference plate and a fourth position that does not block the light, and a control unit configured to control positions of the reference plate and the shielding unit. When the measurement unit measures the white reference plate, the control unit moves the shielding unit to the fourth position and the white reference plate to the first position.

12 Claims, 12 Drawing Sheets

FIG.6A
FIG.6B
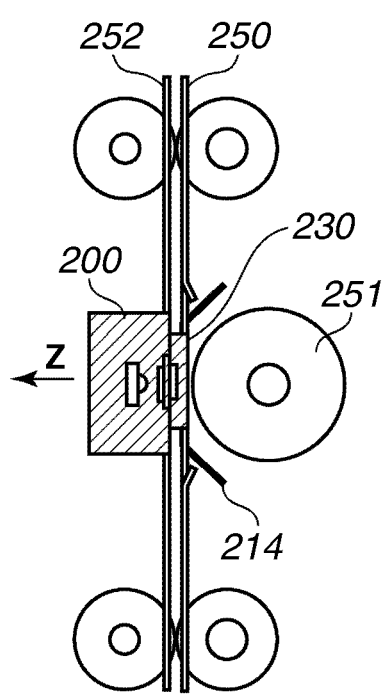
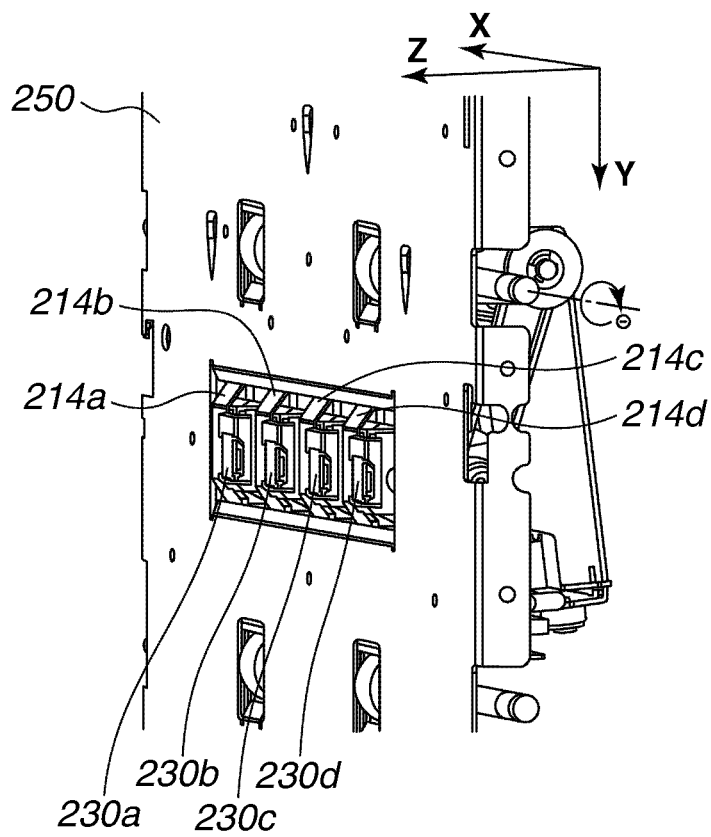

FIG.7A
FIG.7B
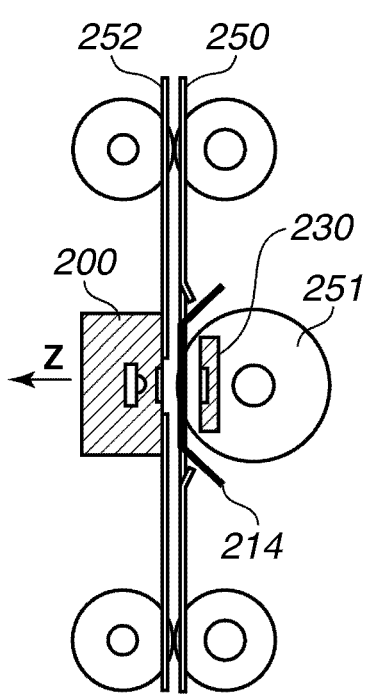
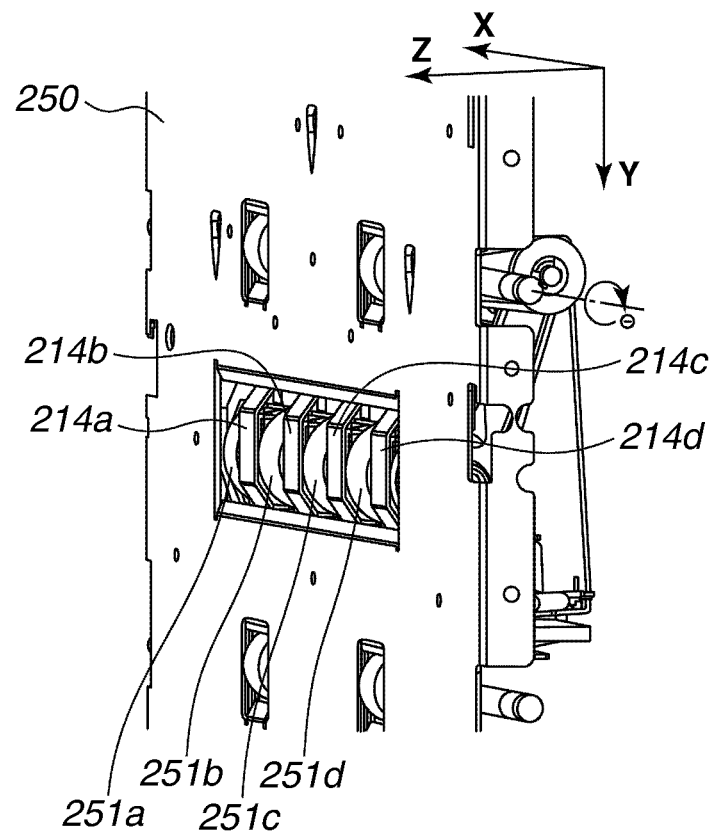

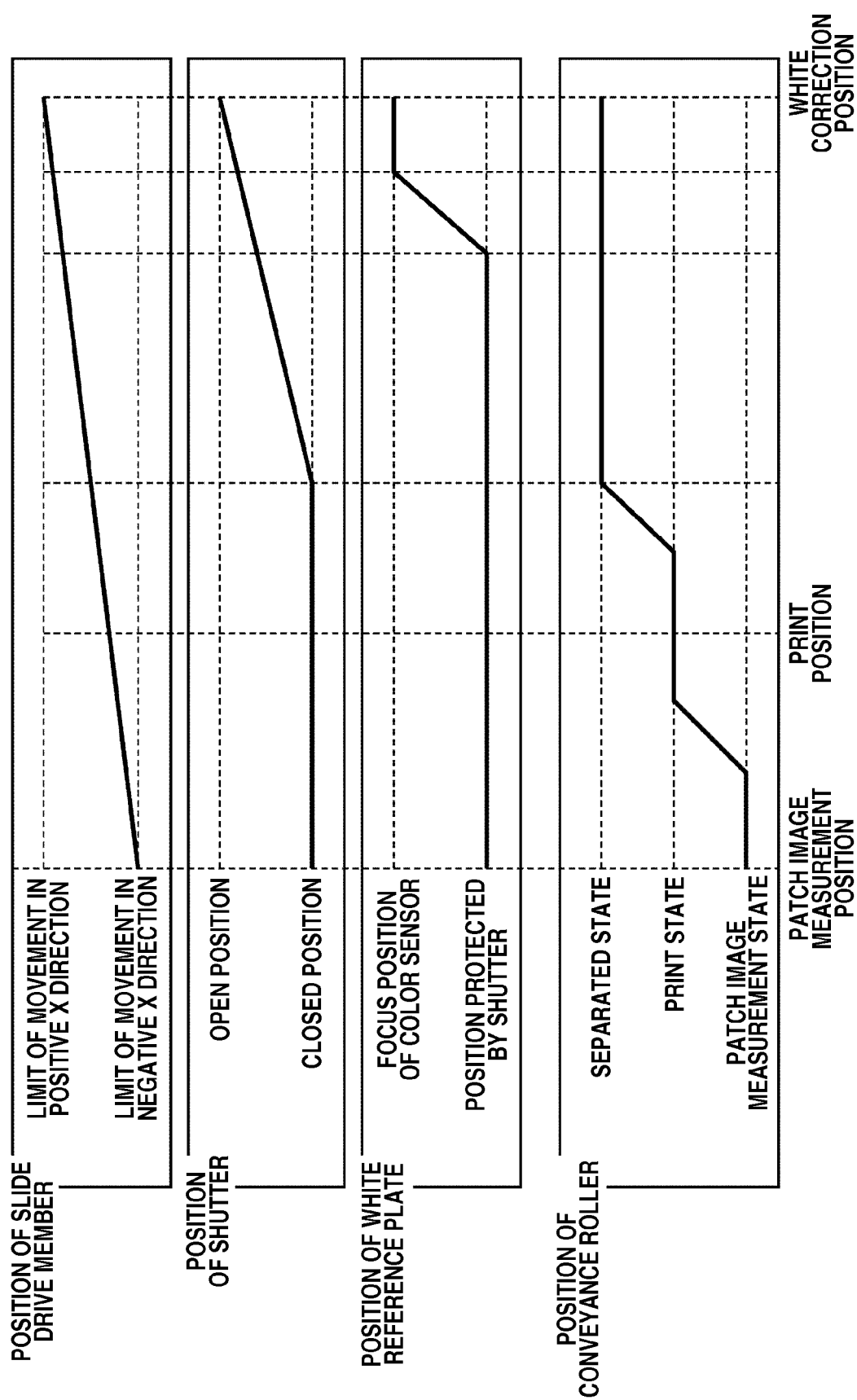

IMAGE FORMING APPARATUS HAVING MEASUREMENT UNIT THAT IRRADIATES A MEASUREMENT IMAGE AND MEASURES LIGHT REFLECTED THEREFROM, AND HAVING SHIELDING UNIT THAT CAN BE MOVED TO BLOCK SUCH IRRADIATION AND MOVED TO NOT BLOCK SUCH IRRADIATION

BACKGROUND OF THE INVENTION

1. Field of the Invention

The present invention relates to an image forming apparatus which has a function of measuring color of a measurement image.

2. Description of the Related Art

An image forming apparatus has image qualities such as granularity, in-plane uniformity, character quality, and color reproducibility (including color stability). With the proliferation of multi-color image forming apparatuses these days, the color reproducibility is sometimes said to be the most important image quality.

People remember empirically expected colors (of human skin, blue sky, and metal in particular), and will feel uncomfortable if acceptable ranges thereof are exceeded. Such colors are called memory colors. Ensuring the reproducibility of memory colors has been often required when outputting photographs.

Aside from photographic images, office users may feel unconformable about a color difference between document images displayed on a monitor and output documents. Graphic arts users are also pursuing the color reproducibility of computer graphics (CG) images. The demand for the color reproducibility (including stability) of an image forming apparatus is therefore increasing.

To satisfy the users' demand for the color reproducibility, Japanese Patent Application Laid-Open No. 2004-086013 discusses an image forming apparatus which reads a measurement image (patch image) formed on a sheet by using a measurement unit (color sensor) arranged on a sheet conveyance path. This image forming apparatus can give feedback to process conditions, including an amount of exposure and a developing bias, based on the reading result of the patch image by the color sensor, whereby a certain density, gradation, and color can be reproduced.

However, the color sensor discussed in Japanese Patent Application Laid-Open No. 2004-086013 causes lower accuracy in color measurement due to factors such as variations in the output of a light source when the ambient temperature changes. Thus, a white reference plate may be arranged in a position opposed to the color sensor. The white reference plate can be measured by the color sensor to perform processing for correcting a measurement value of the color sensor.

However, during measurement of the patch image, if the white reference plate is arranged in the position opposed to the color sensor, the white reference plate is irradiated with light transmitted through the sheet on which the patch image is formed, and thereby discolored. The reason is that the white reference plate contains a substance that discolors due to a photo-oxidation effect.

Thus, there has been a problem that as the number of times of irradiation of the white reference plate with light increases, the discoloration of the white reference plate caused by the irradiating light gradually advances, leading a gradual increase in errors in measurement values.

Another problem is that when a sheet passes through a conveyance path between the color sensor and the white reference plate, foreign substances such as paper dust can adhere to the surface of the white reference plate, causing an error in the measurement value of the white reference plate by the color sensor.

SUMMARY OF THE INVENTION

The present invention is directed to an image forming apparatus capable of suppressing discoloration of a white reference plate and preventing foreign substances such as paper dust from adhering to the white reference plate.

According to an aspect of the present invention, an image forming apparatus includes an image forming unit configured to form a measurement image on a sheet, a measurement unit configured to irradiate the measurement image with light and measure light reflected from the measurement image, a white reference plate arranged to be movable to a first position opposed to the measurement unit and a second position separated farther from the measurement unit than the first position, a shielding unit arranged to be movable to a third position where the shielding unit blocks the light with which the measurement unit irradiates the white reference plate and a fourth position where the shielding unit does not block the light, and a control unit configured to control positions of the white reference plate and the shielding unit. When the measurement unit measures the white reference plate, the control unit moves the shielding unit to the fourth position and the white reference plate to the first position.

Further features of the present invention will become apparent from the following description of exemplary embodiments with reference to the attached drawings.

BRIEF DESCRIPTION OF THE DRAWINGS

FIGS. 6A and 6B are diagrams illustrating a state during measurement of white reference plates.

FIGS. 7A and 7B are diagrams illustrating a state in a print operation.

FIG. 11 is a diagram illustrating operations of shutters, the white reference plates, and conveyance rollers when a slide drive member is moved.

DESCRIPTION OF THE EMBODIMENTS (Image Forming Apparatus)

An exemplary embodiment of the present invention will be described below by using an electrophotographic laser beam printer. In the following description, the electrophotographic method is employed as an example of the image forming method. However, an exemplary embodiment of the present invention may also be applied to an inkjet method and a sublimation method. The inkjet method uses an image forming unit that discharges ink to form an image on a sheet, and a fixing unit (drying unit) that dries the ink.

Figure 1:
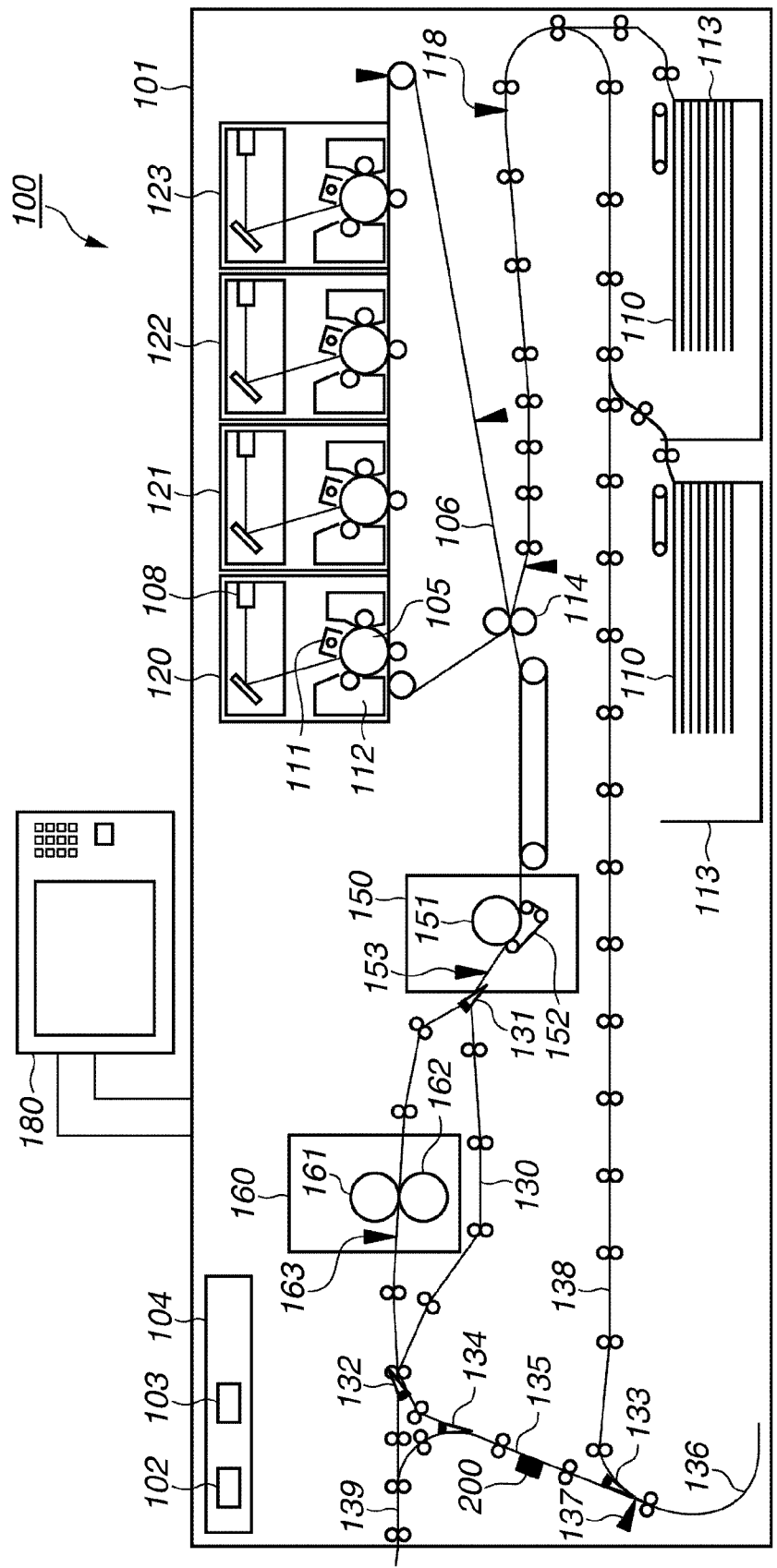
FIG. 1 a sectional view illustrating a structure of an image forming apparatus.

FIG. 1 is a sectional view illustrating a structure of an image forming apparatus 100. The image forming apparatus 100 includes a housing 101. The housing 101 includes mechanisms for constituting an engine unit, and a control board storage unit 104. The control board storage unit 104 stores an engine control unit 102 and a printer controller 103. The engine control unit 102 controls each printing processing (such as paper feeding processing) performed by each of the mechanisms.

As illustrated in FIG. 1, the engine unit includes four stations 120, 121, 122, and 123 corresponding to yellow (Y), magenta (M), cyan (C), and black (K). The stations 120, 121, 122, and 123 are image forming units that transfer toner to a sheet 110 to form an image. The stations 120, 121, 122, and 123 mostly include common parts. Photosensitive drums 105 are a kind of image bearing member. Primary charging devices 111 charge the surfaces of the photosensitive drums 105 with a uniform potential. Lasers 108 output laser light, which forms latent images on the photosensitive drums 105. Developing devices 112 develop the latent images into toner images by using color materials (toner). The toner images (visible images) are transferred to an intermediate transfer member 106. A transfer roller 114 transfers the visible images formed on the intermediate transfer member 106 to a sheet 110 conveyed from a storage unit 113.

A fixing processing mechanism according to the present exemplary embodiment includes a first fixing device 150 and a second fixing device 160. The first and second fixing devices 150 and 160 apply heat and pressure to the toner images transferred to the sheet 110 and thereby fix the toner images to the sheet 110. The first fixing device 150 includes a fixing roller 151 for applying heat to the sheet 110, a pressure belt 152 for pressing the sheet 110 against the fixing roller 151, and a first fixing sensor 153 that detects completion of fixing. The fixing roller 151 is a hollow roller with a heater inside.

The second fixing device 160 is arranged downstream of the first fixing device 150 in a conveyance direction of the sheet 110. The second fixing device 160 adds a gloss to the toner images on the sheet 110 and/or secures fixability. Like the first fixing device 150, the second fixing device 160 includes a fixing roller 161, a pressure roller 162, and a second fixing sensor 163. Some types of sheets 110 need not pass through the second fixing device 160. Such sheets 110 pass through a conveyance path 130 instead of the second fixing device 160 for the purpose of reducing energy consumption.

For example, if a setting is made to give a high gloss to a sheet 110 or if, like thick paper, a sheet 110 needs a great amount of heat for fixing, the sheet 110 passing through the first fixing unit 150 is conveyed to the second fixing device 160. On the other hand, if a sheet 110 is plain paper or thin paper and no setting is made to give a high gloss, the sheet 110 is conveyed through the conveyance path 130 to bypass the second fixing device 160. Whether to convey the sheet 110 to the second fixing device 160 or convey the sheet 110 to bypass the second fixing device 160 is controlled by a changeover member 131.

A changeover member 132 is a guide member that guides the sheet 110 to a conveyance path 135 or an external discharge path 139. A leading edge of the sheet 110 guided into the conveyance path 135 passes a reversing sensor 137 and is conveyed to a reversing unit 136. When the reversing sensor 137 detects a trailing edge of the sheet 110, the conveyance direction of the sheet 110 is switched. A changeover member 133 is a guide member that guides the sheet 110 to a conveyance path 138 for two-sided image formation or the conveyance path 135.

Color sensors 200 for measuring measurement images (hereinafter, referred to as patch images) formed on the sheet 110 are arranged on the conveyance path 135. The color sensors 200 include four color sensors 200a, 200b, 200c, and 200d juxtaposed in a direction orthogonal to the conveyance direction of the sheet 110, and can measure four rows of patch images. When an instruction for color measurement is given from an operation unit 180, the engine control unit 102 performs density adjustment, gradation adjustment, and multi-color correction processing. In the density adjustment and gradation adjustment, the color sensors 200 measure the density of monochrome measurement images. In the multi-color correction processing, the color sensors 200 measure the color of measurement images formed by superposing a plurality of colors.

A changeover member 134 is a guide member that guides the sheet 110 to the external discharge path 139. The sheet 110 conveyed through the discharge path 139 is discharged outside the image forming apparatus 100.

(Color Sensors)

Figure 2:
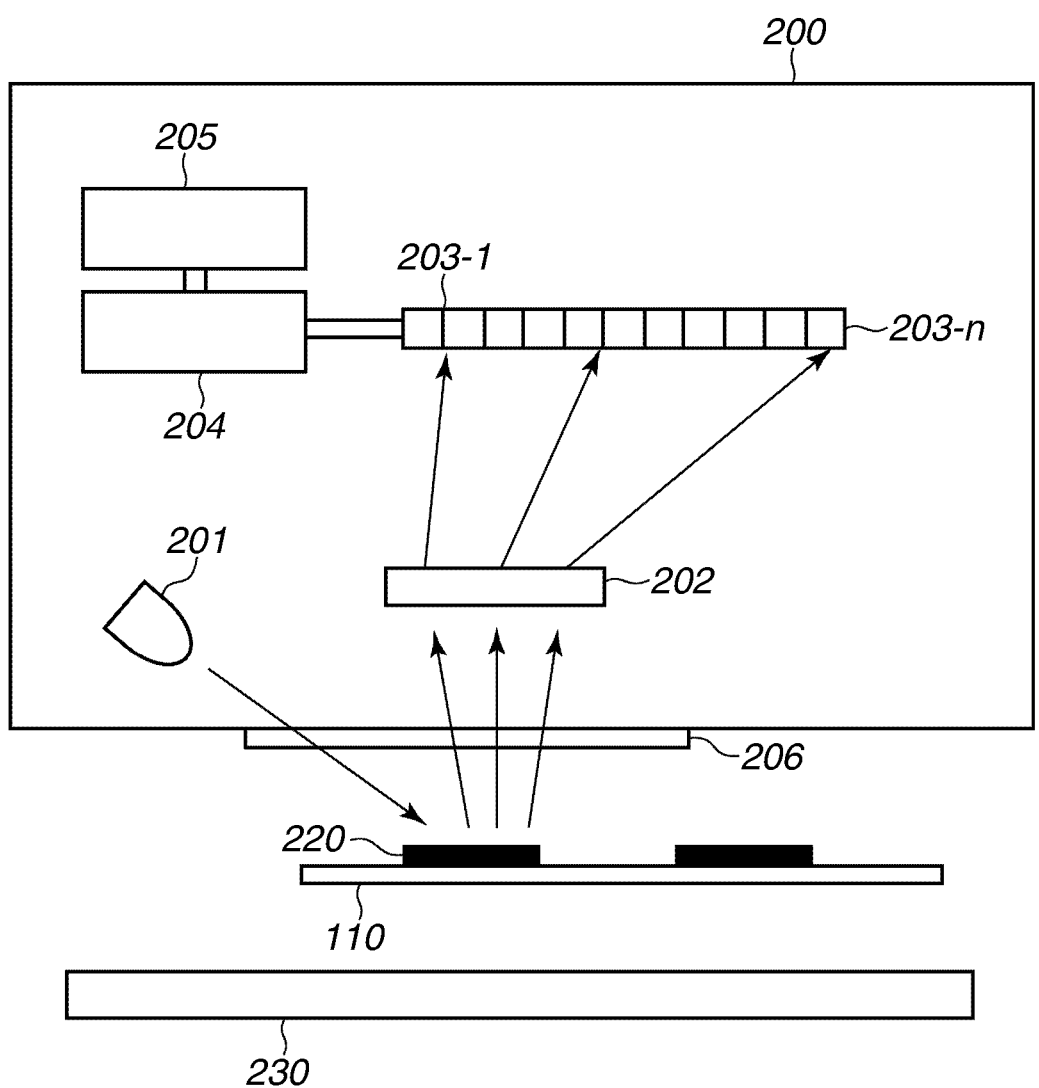
FIG. 2 is a diagram illustrating a structure of a color sensor.

FIG. 2 is a diagram illustrating the structure of a sensor 200. The color sensor 200 includes a white light-emitting diode (LED) 201, a diffraction grating 202, a line sensor 203, a calculation unit 204, and a memory 205. The white LED 201 is a light emitting element which irradiates a patch image 220 on the sheet 110 with light. The light reflected from the patch image 220 passes through a window 206 made of a transparent member.

The diffraction grating 202 disperses the light reflected from the patch image 220, which is a measurement object, by wavelength. The line sensor 203 is a light detection element including N number of light-receiving elements that detect the light resolved by the diffraction grating 202 by wavelength. The calculation unit 204 performs various calculations based on the light intensity values of respective pixels detected by the line sensor 203.

The memory 205 stores various types of data to be used by the calculation unit 204. The calculation unit 204, for example, includes a spectral calculation unit that calculates spectral reflectances from the light intensity values. The color sensor 200 may further include a lens that condenses the light emitted from the white LED 201 on the patch image 220 formed on the sheet 110 and/or condenses the light reflected from the patch image 220 on the diffraction grating 202.

White reference plates 230 are arranged in positions opposed to the color sensors 200. In the present exemplary embodiment, the color sensors 200 measure light reflected from the white reference plates 230 to perform white correction to be described below.

(Profiles)

For the multi-color correction processing, the image forming apparatus 100 generates an International Color Consortium (ICC) profile, which will be described below, from the detection results of the patch images 220 including multiple colors. Using the ICC profile, the image forming apparatus 100 converts an input image into an output image.

Figure 3:
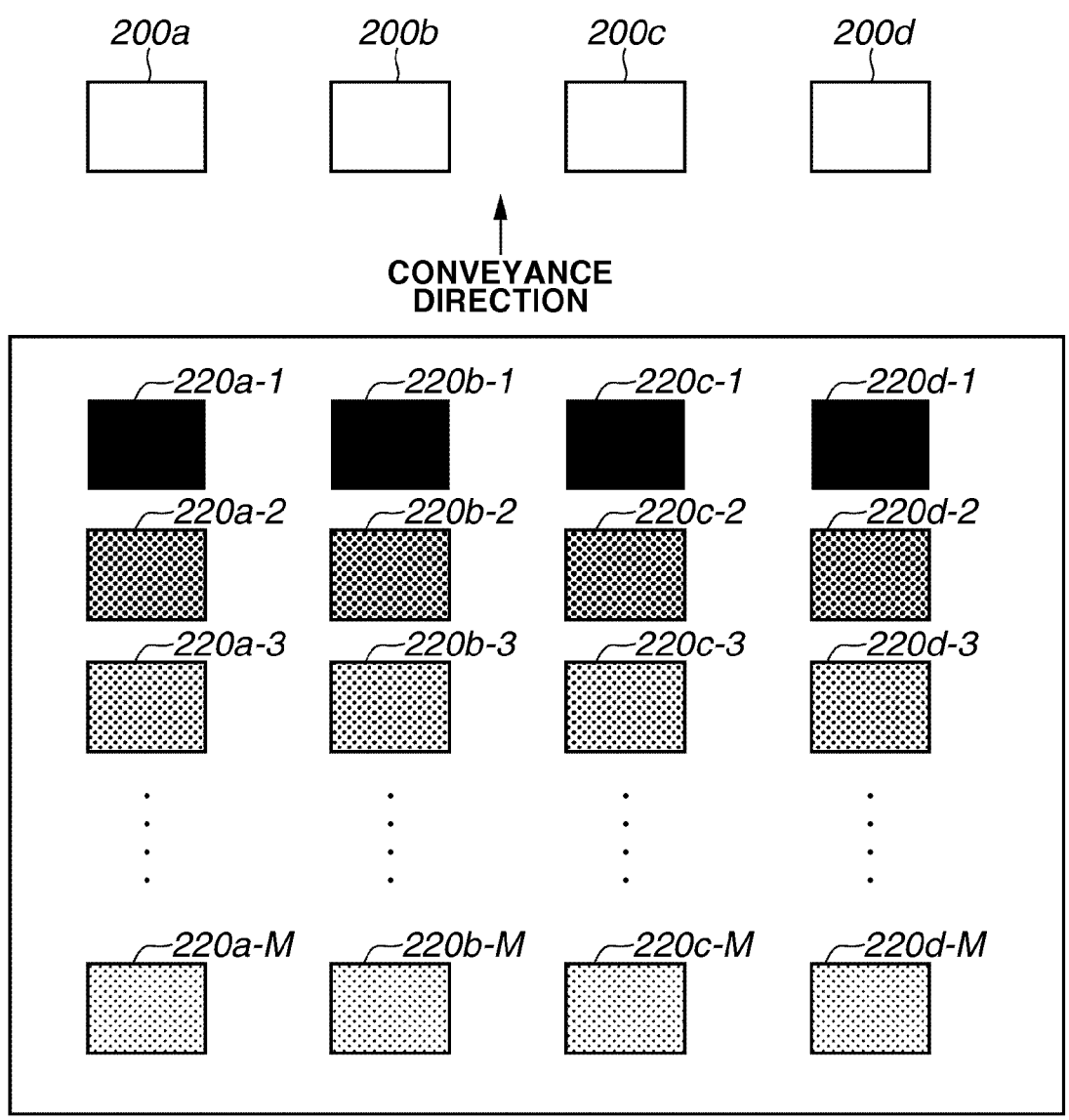
FIG. 3 is an image diagram illustrating a color measurement chart.

The patch images 220 including multiple colors are formed by changing a halftone dot area ratio of each of the four colors, C, M, Y, and K, in three levels (0%, 50%, and 100%) so that the patch images 220 cover all combinations of respective halftone dot area ratios of the four colors. As illustrated in FIG. 3, the patch images 220 formed on the sheet 110 include four rows of the patch images 220a, 220b, 220c, and 220d which are arranged to be read by the color sensors 200a, 200b, 200c, and 200d, respectively. The patch images 220a, 220b, 220c, and 220d include first patch images (220a-1, 220b-1, 220c-1, and 220d-1) to M-th patch images (220a-M, 220b-M, 220c-M, and 220d-M).

The present exemplary embodiment uses an ICC profile which has recently been accepted in the market as a profile implementing excellent color reproducibility. However, the application of an exemplary embodiment of the present invention is not limited to an ICC profile. An exemplary embodiment of the present invention may be applied to the color rendering dictionary (CRD) which has been employed for PostScript Level 2 and later proposed by Adobe Systems Incorporated, and a color separation table in Photoshop (registered trademark).

The user may operate the operation unit 180 to give an instruction to generate a color profile in various situations, for example, when a customer engineer replaces a part, before a job that requires high color matching accuracy is performed, or when the user wants to know the color of a final output product in the design planning phase.

Figure 4:
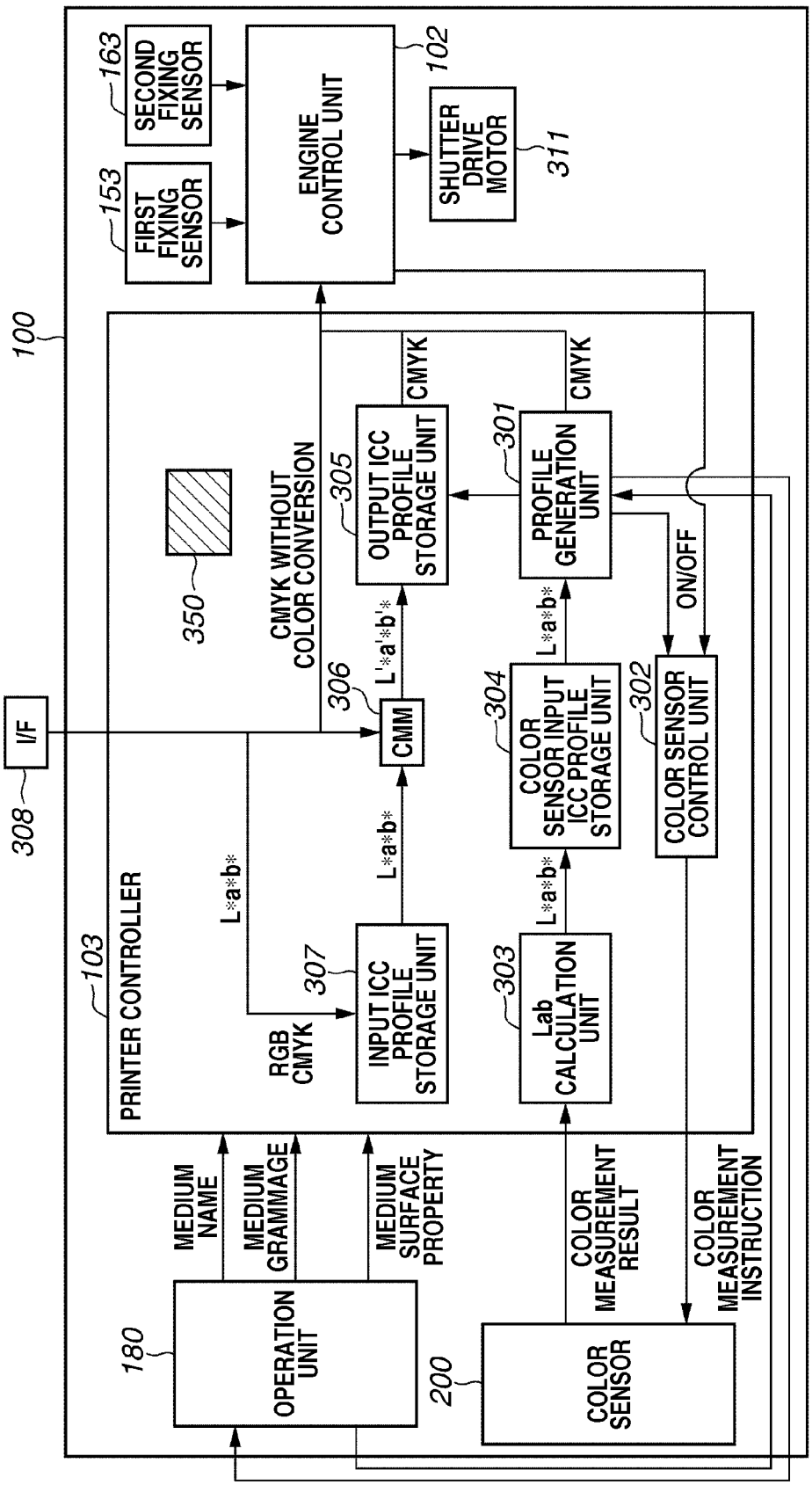
FIG. 4 is a block diagram illustrating a system configuration of the image forming apparatus.

FIG. 4 is a block diagram illustrating the printer controller 103 which performs profile generation processing. The printer controller 103 includes a central processing unit (CPU). The printer control 103 reads a program for performing a flowchart to be described below from a storage unit 350, and executes the program. To facilitate understanding of the processing performed by the printer controller 103, FIG. 4 illustrates the interior of the printer controller 103 in blocks.

When the operation unit 180 receives a profile generation instruction, a profile generation unit 301 outputs a CMYK color chart, which is an International Organization for Standardization (ISO) 12642 test form, to the engine control unit 102 without a profile. The profile generation unit 301 sends a measurement instruction to a color sensor control unit 302. The engine control unit 102 controls the image forming apparatus 100 to perform processes such as charging, exposure, development, transfer, and fixing. As a result, an ISO 12642 test form is formed on a sheet 110.

The color sensor control unit 302 controls the color sensors 200 to measure the ISO 12642 test form. The color sensors 200 output the measurement result, which is spectral reflectance data, to a Lab calculation unit 303 of the printer controller 103. The Lab calculation unit 303 converts the spectral reflectance data into color value data (L*a*b* data) and outputs the L*a*b* data to the profile generation unit 301. Here, the L*a*b* data output from the Lab calculation unit 303 is converted by using a color sensor input ICC profile stored in a color sensor input ICC profile storage unit 304. The Lab calculation unit 303 may convert the spectral reflectance data into the International Commission on Illumination (CIE) 1931 XYZ color space which uses a device-independent color space signal.

The profile generation unit 301 generates an output ICC profile from a relationship between the CMYK color signals output to the engine control unit 102 and the L*a*b* data converted by using the color sensor input ICC profile. The profile generation unit 301 stores the generated output ICC profile in an output ICC profile storage unit 305.

The ISO 12642 test form includes patches of CMYK color signals that cover the entire color reproduction range a typical copying machine can output. The profile generation unit 301 generates a color conversion table from a relationship between the respective color signal values and the measured L*a*b* values. In other words, the profile generation unit 301 generates a CMYK-to-Lab conversion table. Based on the conversion table, the profile generation unit 301 generates an inverse conversion table.

When receiving a profile generation command from a host computer via an interface (I/F) 308, the profile generation unit 301 outputs the generated output ICC profile to the host computer via the I/F 308. The host computer can perform color conversion corresponding to the ICC profile in an application program or programs.

As will be described in detail below, the image forming apparatus 100 includes shutters 214 that block light emitted from the color sensors 200. A shutter drive motor 311 is a motor for driving the shutters 214. The engine control unit 102 controls the shutter drive motor 311.

(Color Conversion Processing)

Color conversion for normal color output will be described. Red, green, and blue (RGB) signal values that are input from a scanner unit via the I/F 308 or an image signal that is input assuming Japan Color or other standard printing CMYK signal values is/are transmitted to an input ICC profile storage unit 307 intended for external input. The input ICC profile storage unit 307 performs RGB-to-L*a*b* or CMYK-to-L*a*b* conversion according to the image signal input from the I/F 308. The input ICC profile storage unit 307 stores an input ICC profile which includes a plurality of lookup tables (LUTs).

Examples of the LUTs include a one-dimensional LUT for controlling a gamma value of the input signal, a multi-color LUT called direct mapping, and a one-dimensional LUT for controlling the gamma value of generated conversion data. Using such LUTs, the input ICC profile storage unit 307 converts the input image signal from the device-dependent color space to device-independent L*a*b* data.

The image signal converted into L*a*b* coordinates is input to a color management module (CMM) 306. The CMM 306 performs various color conversions. For example, the CMM 306 performs a gamut conversion to map mismatches between the reading color space of the scanner unit serving as an input device and the output color reproduction range of the image forming apparatus 100 serving as an output device. The CMM 306 also performs color conversion to adjust a mismatch between the type of the light source at the time of input and the type of the light source with which the output product is observed (also referred to as a mismatch of color temperature settings).

In such a manner, the CMM 306 converts the L*a*b* data into L'*a'*b'* data, and outputs the L'*a'*b'* data to the output ICC profile storage unit 305. The output ICC profile storage unit 305 contains the output ICC profile generated by measurement. The output ICC profile storage unit 305 performs color conversion on the L'*a'*b'* data by using the new output ICC profile generated. The output ICC profile storage unit 305 thereby converts the L'*a'*b'* data into CMYK signals dependent on the output device, and outputs the CMYK signals to the engine control unit 102.

Figure 5:
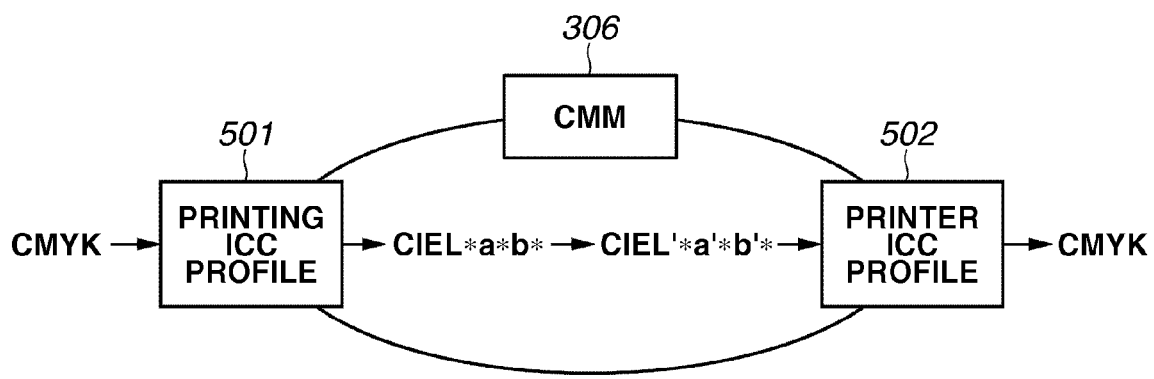
FIG. 5 is a schematic diagram illustrating a color management environment.

In FIG. 4, the CMM 306 is separated from the input ICC profile storage unit 307 and the output ICC profile storage unit 305. In fact, as illustrated in FIG. 5, the CMM 306 refers to a module that governs color management. The module performs color conversion by using an input profile (printing ICC profile 501) and an output profile (printer ICC profile 502).

(Operation of White Reference Plates and Shutters)

Now, an operation of the white reference plates 230 and the shutters 214 will be described with reference to FIGS. 6A, 6B, 7A, 7B, 8A, 8B, and 9. FIGS. 6A and 6B are diagrams illustrating the operation of the color sensors 200 measuring the white reference plates 230. FIGS. 7A and 7B are diagrams illustrating the operation of the color sensors 200 measuring the patch images 220 on the sheet 110.

FIG. 6A is a sectional view of the vicinity of the color sensors 200. FIG. 6B is a perspective view three-dimensionally illustrating a state near the white reference plates 230. The Z-axis of FIG. 6A and the Z-axis of FIG. 6B indicate the same direction. FIGS. 7A and 7B have a similar layout to that of FIGS. 6A and 6B.

As illustrated in FIG. 6A, during measurement of the white reference plates 230, the shutters 214 are open and the white reference plates 230 are located close to the color sensors 200. The white reference plates 230 are pressed against a conveyance guide 252 by a pressure member such as a spring, and thereby positioned with respect to the color sensors 200. By such a configuration, the positions of the white reference plates 230 with respect to the color sensors 200 are prevented from varying in angle or distance.

The white reference plates 230 are configured to be pressed against the conveyance guide 252 in view of the durability of the color sensors 200. Instead, in view of the measurement accuracy, the white reference plates 230 may be pressed against the color sensors 200 for positioning.

With the white reference plates 230 thus pressed and positioned, the color sensors 200 measure the white reference plates 230. In such a state (contact state), the white reference plates 230 are positioned to where the sheet 110 passes.

As illustrated in FIG. 6B, during the measurement (white correction) of the while reference plates 230, the shutters 214 are shifted in a positive X direction and retracted off the white reference plates 230. The retracted positions of the shutters 214 are between the conveyance rollers 251 separated from the conveyance guide 252 and the conveyance guide 252.

As described above, the four color sensors 200a, 200b, 200c, and 200d are juxtaposed in the direction orthogonal to the conveyance direction of the sheet 110. The shutters 214a, 214b, 214c, and 214d, the white reference plates 230a, 230b, 230c, and 230d, and the conveyance rollers 251a, 251b, 251c, and 251d are arranged in positions opposed to the color sensors 200a, 200b, 200c, and 200d, respectively.

In a print operation, as illustrated in FIG. 7A, the white reference plates 230 are separated from the color sensors 200 not to interfere with the conveyance of the sheet 110. The shutters 214 move to shielding positions between the white reference plates 230 and the color sensors 200. In the shielding positions, the shutters 214 are located approximately on the same plane as that of a conveyance guide 250 not to interfere with the conveyance of the sheet 110. As illustrated in FIG. 7B, the shutters 214 can cover the white reference plates 230 so that foreign substances such as paper dust are prevented from adhering to the white reference plates 230 during the print operation.

In the print operation, the sheet 110 is conveyed between the conveyance guides 250 and 252. The white LEDs 201 of the color sensors 200 are turned off.

Figure 8A:
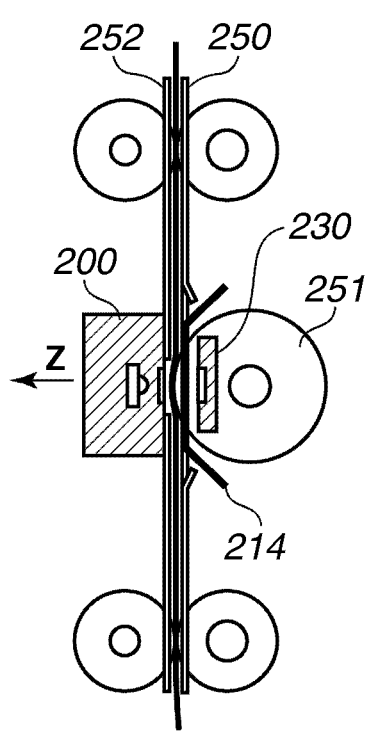
FIGS. 8A and 8B are diagrams illustrating a state during measurement of patch images.
Figure 8B:
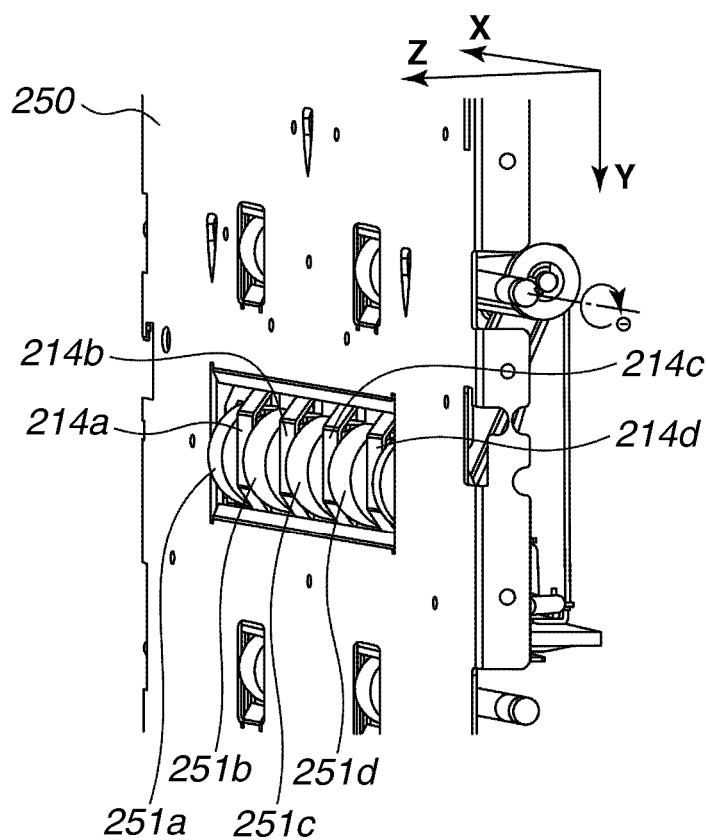

FIG. 8A illustrates a state during measurement of the patch images 220. The conveyance rollers 251 are moved in a direction toward the color sensors 200 (Z direction), so that the sheet 110 is pressed toward the color sensors 200 while being conveyed. The reason is that the position of the sheet 110 needs to be adjusted to the focus positions of the color sensors 200. The focus positions are set to the positions along the conveyance guide 252. The color sensors 200 measure the patch images 220 on the conveyed sheet 110.

The white reference plates 230 are separated from the color sensors 200 not to interfere with the conveyance of the sheet 110. The shutters 214 are located between the white reference plates 230 and the color sensors 200. The purpose is to prevent the white reference plates 230 from being discolored by the irradiation of light transmitted through the sheet 110 on which the patch images 220 are formed. Another purpose is to prevent foreign substances such as paper dust from adhering to the white reference plates 230.

(Configuration of Shutter Drive Unit)

Figure 9:
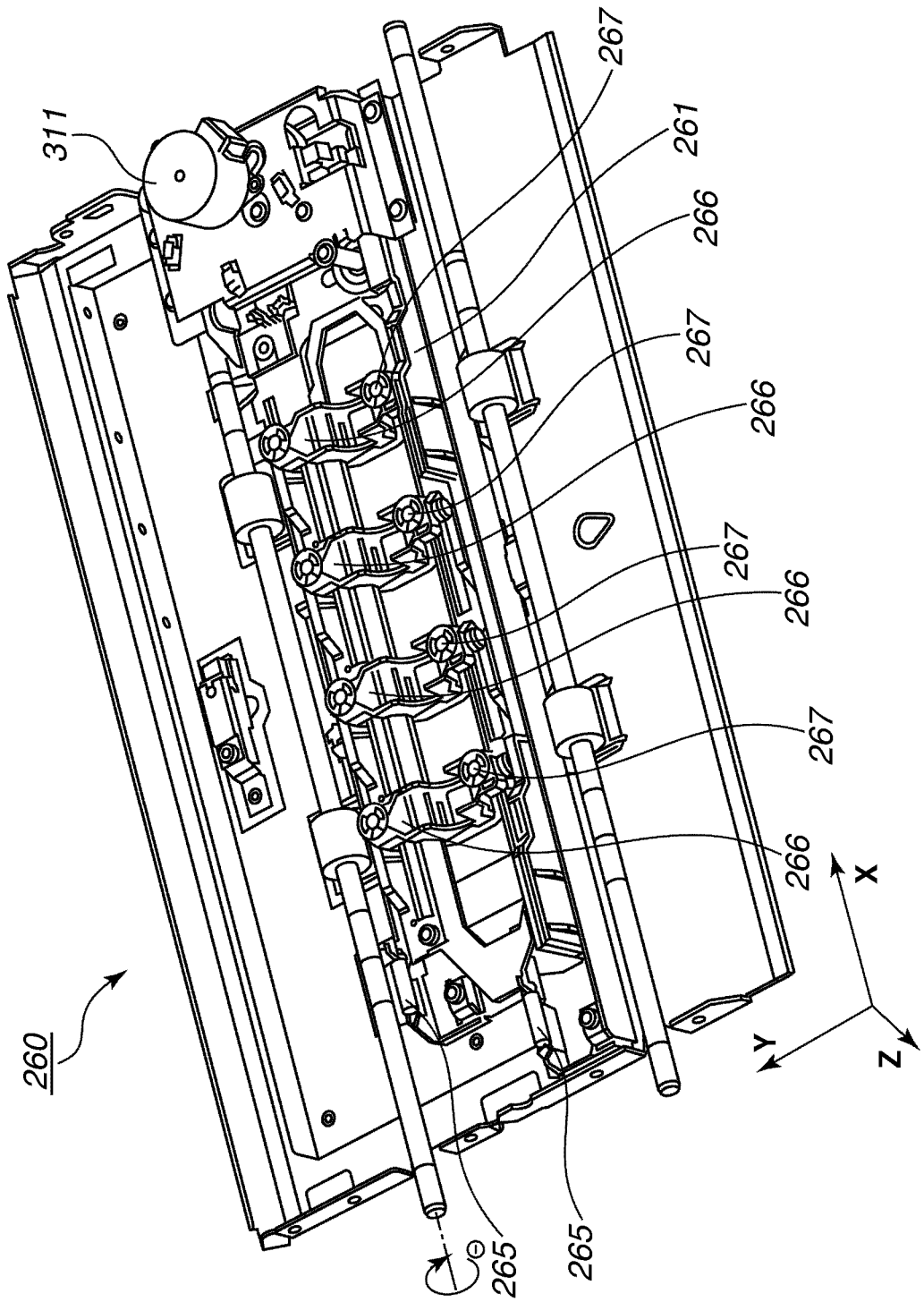
FIG. 9 is a diagram illustrating a configuration of a shutter drive unit.

FIG. 9 is a diagram illustrating a configuration of a shutter drive unit 260. The X-, Y-, and Z-axes of FIG. 9 correspond to the X-, Y-, and Z-axes of FIGS. 6A, 6B, 7A, 7B, 8A, and 8B.

The shutter drive unit 260 is fixed to the conveyance guide 250 which is fixed to a frame (not illustrated). The shutter drive motor 311 drives a slide drive member 261 to reciprocate in the X direction. The slide drive member 261 is connected to the shutters 214 via support portions 262 to be described below, thereby constituting a mechanically interlockable configuration.

The shutters 214 are supported to be movable in the X direction. White reference plate holding members 266 come into contact with slide cams which are integrally formed with the shutters 214. By such a configuration, the white reference plates 230 and the shutter 214 are simultaneously pressed in the Z direction for positioning.

(Description of Three Positions)

As described with reference to FIGS. 6A, 6B, 7A, 7B, 8A, and 8B, the white reference plates 230, the shutters 214, and the conveyance rollers 251 take different positions depending on the operation of the image forming apparatus 100 (white correction, a print operation, and the measurement of the patch images 220). The positions will be described in detail with reference to FIGS. 10A, 10B, 10C, and 11. The X- and Z-axes of FIGS. 10A, 10B, and 10C correspond to the X- and Z-axes of FIGS. 6A, 6B, 7A, 7B, 8A, 8B, and 9.

(1) White Correction Position

Figure 10A:
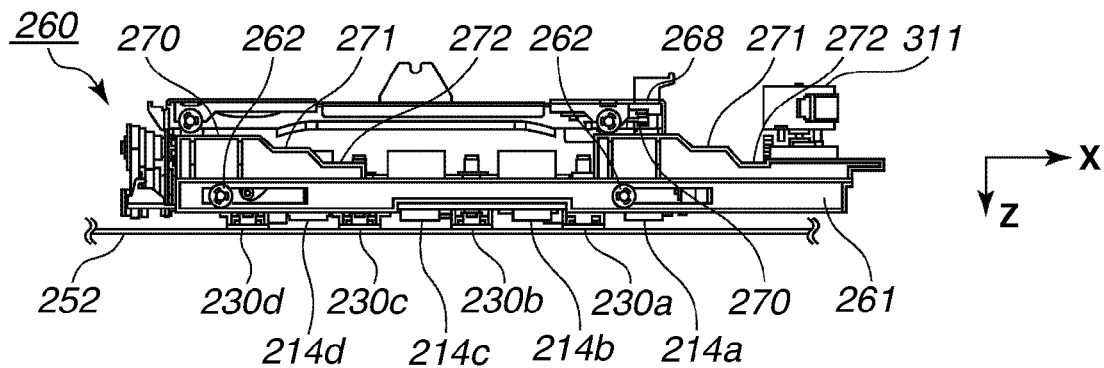
FIGS. 10A, 10B, and 10C are diagrams illustrating three positions in detail.

FIG. 10A is a diagram illustrating a white correction position. In FIG. 11, the white correction position is illustrated on the rightmost side.

In order for the color sensors 200 to accurately measure the patch images 220, white correction needs to be performed by using the white reference plates 230 before the measurement. When performing the white correction, the white reference plates 230 need to be positioned to the focus positions of the color sensors 200. For this purpose, the shutters 214 are moved to open positions which expose the white reference plates 230. As the shutter drive motor 311 moves the slide drive member 261 in the positive X direction, the shutters 214 can be moved in the positive X direction in an interlocked manner.

A roller support member 268 comes into contact with cam portions 270 of the slide drive member 261, whereby the conveyance rollers 251 are positioned to the positions separated from the color sensors 200.

(2) Print Position

Figure 10B:
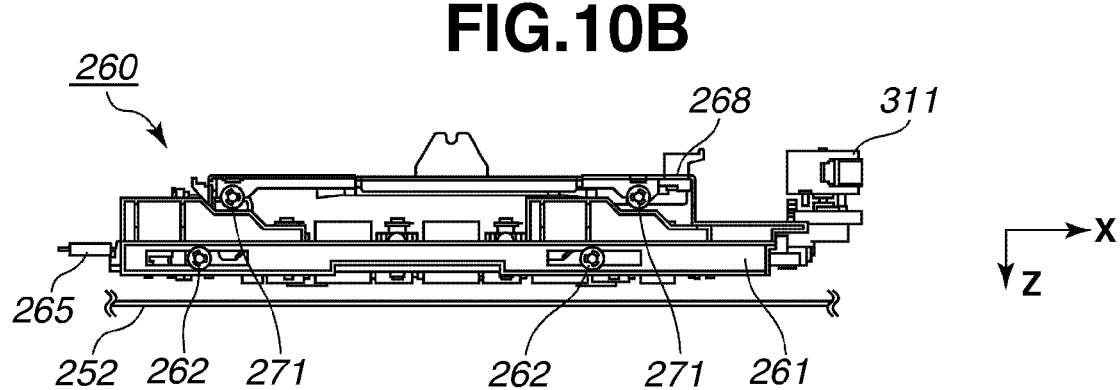

FIG. 10B is a diagram illustrating a print position. In FIG. 11, the print position is illustrated between the white correction position and a patch image measurement position.

When the image forming apparatus 100 performs a normal print operation, the shutters 214 need to protect the white reference plates 230 from the adhesion of paper dust of sheets 110 conveyed in large numbers and impurities evaporating from thermally fixed toner.

The roller support member 268 comes into contact with cam portions 271 of the slide drive member 261, whereby the conveyance rollers 251 are set to approximately the same position as a sheet passing surface of the conveyance guide 250. As the slide drive member 261 moves to the position illustrated in FIG. 10B, the shutters 214 move to closed positions where the shutters 214 cover the white reference plates 230. The shutters 214 are pulled in a negative X direction in the diagram by shutter tension springs 265 and come into contact with shafts 267 illustrated in FIG. 9 to stop. The shutters 214 are stopped at the positions along the surface of the conveyance guide 250.

(3) Patch Image Measurement Position

Figure 10C:
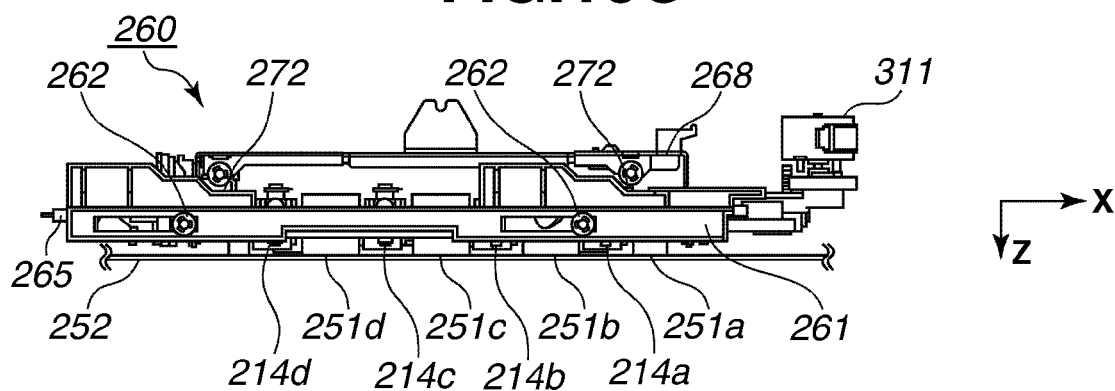

FIG. 10C is a diagram illustrating the patch image measurement position. In FIG. 11, the patch image measurement position is illustrated on the leftmost side.

When the image forming apparatus 100 conveys and measures a sheet 110 on which the patch images 220 are formed, the sheet 110 needs to be positioned to the focus positions of the color sensors 200.

The roller support member 268 comes into contact with cam portions 272 of the slide drive member 261, whereby the conveyance rollers 251 are pressed toward the conveyance guide 252 and positioned to the focus positions with high accuracy. Here, the slide drive member 261 is unlinked from the shutters 214. Consequently, while the slide drive member 261 moves from the position illustrated in FIG. 10B to the position illustrated in FIG. 10C, the shutters 214 remain in the closed positions and only the conveyance rollers 251 can be operated.

(Shutter Drive Control Flow)

Figure 12:
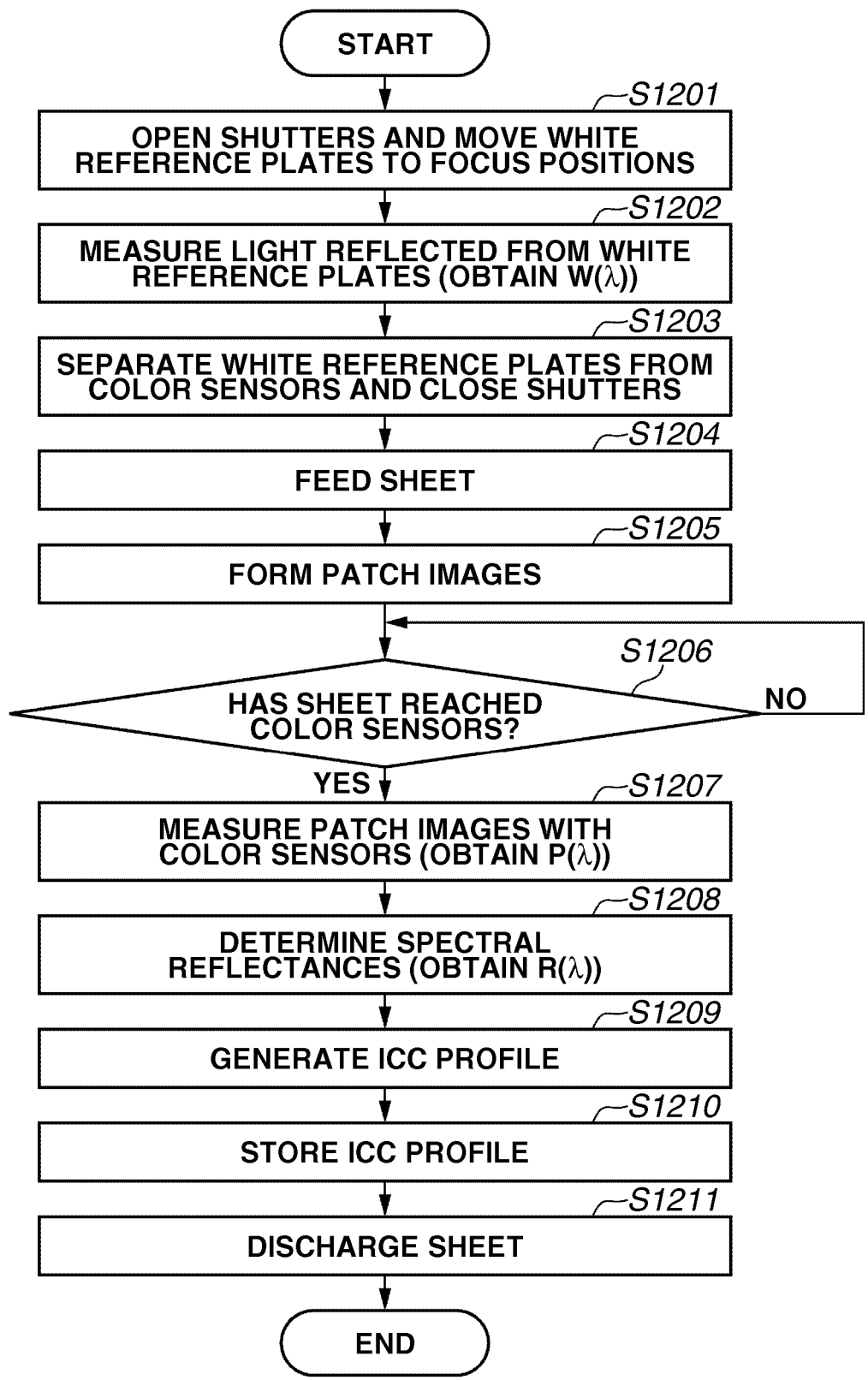
FIG. 12 is a flowchart illustrating a shutter drive control during white correction and patch image measurement.

FIG. 12 is a flowchart illustrating a drive control of the shutters 214 during white correction and patch image measurement. This flowchart is executed by the printer controller 103. The printer controller 103 performs the processing of the flowchart in response to an instruction to execute the multi-color correction processing from the operation unit 180.

In step S1201, the printer controller 103 instructs the engine control unit 102 to open the shutters 214 to expose the white reference plates 230 and move the white reference plates 230 to the focus positions of the color sensors 200 in an interlocked manner. The engine control unit 102 controls the shutter drive motor 311 based on the instruction.

In step S1202, the printer controller 103 irradiates the write reference plates 230 with light and measures light reflected from the white reference plates 230 by using the color sensors 200. The printer controller 103 thereby obtains measurement values $W(\lambda)$.

In step S1203, after the end of the measurement of the white reference plates 230, the printer controller 103 instructs the engine control unit 102 to separate the white reference plates 230 from the color sensors 200 and close the shutters 214 to cover the white reference plates 230 in an interlocked manner. The engine control unit 102 controls the shutter drive motor 311 based on the instruction.

In step S1204, the printer controller 103 instructs the engine control unit 102 to feed a sheet 110 from the storage unit 113. In step S1205, the printer controller 103 instructs the engine control unit 102 to form the patch images 220 for the multi-color correction processing on the fed sheet 110.

In step S1206, the printer controller 103 waits until the sheet 110 on which the patch images 220 are formed reaches the color sensors 200. If the sheet 110 has reached the color sensors 200 (YES in step S1206), then in step S1207, the printer controller 103 causes the color sensors 200 to measure the patch images 220. The printer controller 103 thereby obtains measurement values $P(\lambda)$.

Spectral reflectances $R(\lambda)$ of the patch images 220 are determined from the measurement values $W(\lambda)$ obtained in step S1202 and the measurement values $P(\lambda)$ obtained in step S1207. Specifically, the spectral reflectances $R(\lambda)$ can be determined by $R(\lambda)=P(\lambda)/W(\lambda)$. In step S1208, the printer controller 103 obtains spectral reflectance data $R(\lambda)$ output from the color sensors 200.

The printer controller 103 then calculates color value data (L*a*b*) from the spectral reflectance data $R(A)$ output from the color sensors 200 by using the Lab calculation unit 303. In step S1209, the printer controller 103 generates an ICC profile as an image forming condition by the foregoing processing based on the color value data (L*a*b*). In step S1210, the printer controller 103 stores the ICC profile in the output ICC profile control unit 305.

In step S1211, the printer controller 103 instructs the engine control unit 102 to discharge the sheet 110, and ends the processing of the flowchart.

(Effects)

As has been described above, according to the present exemplary embodiment, during white correction, the shutters 214 are opened and the white reference plates 230 are moved to the focus positions to enable accurate white correction. Further, according to the present exemplary embodiment, the white reference plates 230 are covered with the shutters 214 during the measurement of the patch images 220. This can suppress the discoloration of the white reference plates 230 due to light transmitted through the sheet 110. Furthermore, according to the present exemplary embodiment, the white reference plates 230 are covered with the shutters 214 when the white reference plates 230 are not used. This can prevent foreign substances such as paper dust from adhering to the white reference plates 230.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288229 filed Dec. 28, 2012, which is hereby incorporated by reference herein in its entirety.

What is claimed is:

1. An image forming apparatus comprising:
   an image forming unit configured to form a measurement image on a sheet;
   a measurement unit configured to irradiate the measurement image with light and measure light reflected from the measurement image;
   a white reference plate arranged to be movable to a first position opposed to the measurement unit and a second position being far away from the measurement unit than the first position;
   a shielding unit arranged to be movable to a third position where the shielding unit blocks the light with which the measurement unit irradiates the white reference plate and a fourth position where the shielding unit does not block the light;
   a conveyance unit arranged to be movable to a fifth position opposed to the measurement unit and a sixth position being farther away from the measurement unit than the fifth position, and convey the sheet; and
   a control unit configured to control positions of the white reference plate and the shielding unit and the conveyance unit,
   wherein, in a case where the measurement unit measures the white reference plate, the shielding unit is at the fourth position, the white reference plate is at the first position, and the conveyance unit is at the sixth position,
   wherein, in a case where the measurement unit measures the measurement image, the white reference plate is at the second position, the shielding unit is at the third position, and the conveyance unit is at the fifth position, wherein, in a print operation, the shielding unit is at the third position, the white reference plate is at the second position, and the conveyance unit is at a seventh position between the fifth and sixth positions, wherein the print operation is performed without a measurement of the white reference plate performed by the measurement unit, and wherein the print operation is performed without a measurement of the measurement image performed by the measurement unit.

2. The image forming apparatus according to claim 1, further comprising a generation unit configured to generate an image forming condition for forming an image on a sheet based on a measurement result of the measurement image by the measurement unit.

3. The image forming apparatus according to claim 1, further comprising a correction unit configured to correct a measurement result of the measurement image based on a measurement result of the white reference plate by the measurement unit.

4. The image forming apparatus according to claim 1, wherein the measurement image is a multi-color image formed by using color materials of a plurality of colors, and wherein the measurement unit is configured to measure spectral information in the measurement image.

5. The image forming apparatus according to claim 1, wherein the measurement unit is configured to measure color of the measurement image by irradiating the measurement image with the light, dispersing the light reflected from the measurement image by wavelength, and measuring the dispersed light.

6. The image forming apparatus according to claim 1, wherein the shielding unit and the white reference plate are configured to move in a mechanically interlocked manner.

7. The image forming apparatus according to claim 1, wherein the image forming unit is a unit configured to transfer toner to the sheet to form the measurement image.

8. The image forming apparatus according to claim 1, wherein the image forming unit is a unit configured to discharge ink to form the measurement image on the sheet.

9. The image forming apparatus according to claim 1, wherein the measurement unit measures color information of the measurement image.

10. The image forming apparatus according to claim 1, wherein the measurement unit measures spectral reflectance of the measurement image based on a measurement result of the measurement image and a measurement result of the white reference plate.

11. The image forming apparatus according to claim 1, wherein the conveyance unit is configured to push the sheet to the side of the measurement unit at a position different from a measurement position of the measurement unit in a direction perpendicular to the conveyance direction of the sheet.

12. The image forming apparatus according to claim 11, wherein the conveyance unit is configured to push the sheet to the side of the measurement unit at a same position as the measurement position in the conveyance direction of the sheet.

\* \* \* \* \*